United States Patent Office 3,350,407
Patented Oct. 31, 1967

3,350,407
SULFUR CONTAINING PYRAZOLE
DERIVATIVES
Horace Fletcher 3rd, Pottstown, and Harvey E. Alburn, West Chester, Pa., assignors to American Home Products Corporation, New York, N.Y., a corporation of Delaware
No Drawing. Filed July 2, 1964, Ser. No. 380,024
6 Claims. (Cl. 260—310)

ABSTRACT OF THE DISCLOSURE 3-mercaptoalkylpyrazoles and disulfides thereof, optionally substituted in the 5-position with lower alkyl (I), 1-mercaptoalkylpyrazoles and disulfides thereof, optionally substituted in the 3-position or 5-position or both with lower alkyl (II), and non-toxic acid-addition salts of (I) and (II) are prepared by reacting a haloalkylpyrazole or an alkyl-p-toluenesulfonate pyrazole with an alkali metal benzyl mercaptide and reducing the thus-obtained benzylthioether, then, if required, treating the mercaptoalkylpyrazole with an oxidizing agent in alkaline medium to form a disulfide, and, if required, treating free base compound (I) or (II) with an acid. Compounds (I) and (II) and their salts have diuretic and hypoglycemic activity.

This invention relates to new derivatives of pyrazole. More particularly this invention relates to novel sulfur containing pyrazole derivatives and to the method by which these new compounds are prepared. The new compounds of the present invention considered in their broadest aspect include those compounds defined by following formulae:

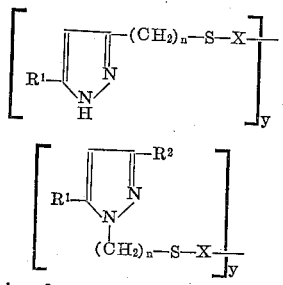

In the foregoing formulae, $R^1$ and $R^2$ are selected from the group consisting of hydrogen and lower alkyl, X when present is hydrogen, $n$ is an integer of from 1 to 3 inclusive and $y$ is an integer of from 1 to 2 inclusive with the proviso that X is present only when $y$ is 1. Additionally the invention encompasses the nontoxic therapeutically administrable acid addition salts of the compounds falling within the foregoing formulae. Chain length in a particular species of the compound encompassed within Formulae I and II is as described more specifically in the examples which follow.

As will be immediately apparent from the foregoing, when $y$ has a value of 2, the new compounds of the present invention are in the structure of disulfides in which there is a sulfur to sulfur link as shown by the dangling valence at the bracket of the Formulae I and II. When $y$ has the value of 1, hydrogen (X) is present on the sulfur atom thereby providing a thiol.

The new compounds of the present invention are prepared by reacting the appropriate haloalkyl or alkyl p-toluenesulfonate ester derivative of pyrazole with sodium benzylmercaptide in an inert lower molecular weight solvent such as ethanol or the like, isolating the crude benzyl thioether and reducing the thioether with alkali metal in liquid ammonia to the thiol. The compound wherein $y$ of the Formulae I and II has a value of 2, namely the disulfides, are prepared by oxidation of the monopyrazole derivatives in an alkaline medium by using such oxidizing agents as hydrogen peroxide or the like or with air being bubbled therethrough in a conventional manner.

The starting haloalkyl derivatives of pyrazole are well known or may be prepared according to the method described in J. Org. Chem. 19, 1428-34 (1954) Reuben G. Jones et al. for haloalkyl derivatives of pyrazole, and the alkyl p-toluenesulfonate ester derivatives are prepared by reacting the appropriate hydroxy derivatives with p-toluenesulfonyl chloride in pyridine using standard methods.

As has been suggested, the new compounds of the present invention encompass the acid addition salt form thereof which is obtained by converting the free base to the acid salt in accordance with conventional procedure such as dissolving the free base in solvent and passing HCl gas therethrough or converting by other known means. Other acid salts are prepared by treating the base with acceptable organic or inorganic acids. Suitable acids for this purpose include hydrobromic, sulfuric, phosphoric, nitric, benzoic, methyl sulfonic, p-tolyl sulfonic, benzene sulfonic, naphthalene sulfonic, salicylic, glycolic, acetic, maleic, succinic, tartaric, stearic, palmitic, citric, glutaric, lactic and the like.

The new compounds of the present invention quite unexpectedly possess valuable pharmaceutical properties. In particular, the new compounds of the present invention possess both diuretic and hypoglycemic activity. These new compounds are therefore useful for such purposes. When used for these purposes described above, it may be desirable according to conventional pharmaceutical practice to combine the specific compound identified into compositions suitable for enteral or parenteral administration by combining the same with a pharmaceutically administrable organic or inorganic carrier. The composition may be prepared in solid form, such as in tablets or in liquid form such as a solution, suspension or emulsion. Suitable liquid carriers include water, gelatin, lactose starch, talc, vegetable oils, alcohols, polyalcohols, gums, USP syrups and the like. The pharmaceutical composition in addition to the active principle and the carrier may include auxiliary materials such as coloring, stabilizing, wetting or emulsifying agents. It is of course recognized as essential that the carrier as well as any other materials present with the active principle be inert with respect thereto.

When the pharmaceutical preparation is compounded in the manner suggested above, the active compound will be present in an amount of from about 1 to about 500 mg./cc. of the vehicle. Preferably the active compound will be present in an amount of from 1 to about 100 mg./cc. of the carrier. When so prepared, the new compounds may be administered in therapeutic dosages of from about 25 to about 500 mg., preferably as a 250 mg. tablet.

The new compounds of this invention will be better understood as will the novel method of preparation by referring now to the specific examples which follow.

Example I 20 gms. (0.35 mole) of sodium methoxide and 26 gms. (0.21 mole) of α-toluenethiol are stirred in 1 l. of anhydrous ethanol for 30 minutes, and then 23.5 gms. (0.14 mole) of 3-chloromethyl-5-methyl pyrazole hydrochloride is added in portions over 10 minutes. The mixture is stirred for 1 hour at room temperature and then refluxed for 1 hour, cooled, and filtered. The filtrate is evaporated in vacuo. The residue is dissolved in 300 ml. of 4 N HCl and extracted with ether to remove excess benzylmercaptan. The aqueous layer is then adjusted to pH 8 with solid sodium carbonate and re-extracted with 2×300 ml. of ether. The ether layer is dried over Na₂SO₄, filtered, and evaporated. The residue weighs 29.0 gms. or 95%. The thioether is dissolved in 50 ml. of dry tetrahydrofuran and is added to 300 ml. of liquid ammonia. Sodium pellets are added until the solution remains blue for 20 minutes, and then 10 gms. of solid ammonium chloride is added. The ammonia is evaporated and the residue dissolved in 200 ml. of 4 N HCl and extracted with ether to remove any dibenzyl present. The ether extracts are discarded and the aqueous phase adjusted to pH 7 with conc. NH₄OH. The oil which separates is extracted with 2×200 ml. of ether or benzene, dried over Na₂SO₄, filtered, and evaporated. The residue, 3-mercaptomethyl-5-methyl pyrazole, is distilled, the fraction, boiling between 101 and 105° C. at 0.2 mm., weighed 9.0 gms. or 51.5% of theory.

Following the procedure of Example I, utilizing suitably substituted pyrazole starting compounds, one can prepare 3 - mercaptopropyl - 5 - ethylpyrazole, 3-mercaptomethyl - 5 -butylpyrazole, 3 - mercaptoethylpyrazole, 3- mercaptomethyl - 5 - propylpyrazole, 3-mercaptopropyl- pyrazole and similar compounds.

Example II 3.84 gms. (0.03 mole) of 3-mercaptomethyl-5-methyl- pyrazole, 1.3 gms. (0.033 mole) of sodium hydroxide and 2 ml. of 2% ferric chloric solution are dissolved in 50 ml. of water. 4.2 ml. of 30% hydrogen peroxide is added dropwise while the temperature is kept below 18° C. After 15 minutes the suspension is adjusted to pH 5 with acetic acid. 50 ml. of benzene is added and the suspension filtered. The filtrate is separated and the benzene layer used to dissolve the solid on the filter. After filtering an insoluble brown material, the filtrate is dried over Na₂SO₄, filtered, and evaporated. The residue is dissolved in ether and converted to the hydrochloride salt with HCl gas. The product, bis(5-methyl-3-pyrazolyl- methyl)disulfide dihydrochloride, is recrystallized from hot ethanol. Yield 2.2 gms., M.P. 225–227° C. dec.

Following the procedure of Example II and utilizing starting compounds prepared according to Example I including those identified immediately thereafter, one can obtain bis(5 - ethyl - 2-pyrazolylpropyl)disulfide, bis(5- butyl - 3 - pyrazolylmethyl)disulfide, bis(5 - propyl-3- pyrazolylmethyl)disulfide, bis(3 - pyrazolylmethyl)disul- fide and bis(5-methyl-3-pyrazolylbutyl)disulfide.

Example III 104 gms. (0.75 mole) of α-toluenethiol and 30 gms. (0.75 mole) of sodium hydroxide is dissolved in 1.5 1. of ethanol. 88.3 gms. (0.3 mole) of 3,5-dimethylpyrazolyl- 1-ethyl p-toluenesulfonate is added and the reaction refluxed for 2 hours with stirring. The ethanol is then evaporated in vacuo, and the residue is dissolved in 1 1. of 2 N HCl. The solution is extrated with 2×200 ml. of ether and the ether extracts discarded. The aqueous phase is neutralized to pH 7 with conc. ammonium hydroxide and the intermediate benzyl thioether extracted into ether, dried over anhydrous sodium sulfate, filtered, and the ether evaporated in vacuo. The benzyl group is removed with sodium in liquid ammonia as in Example I, B.P. 82–85° C./0.1–0.2 mm. Yield of 3,5-dimethyl-1-pyrazole-ethane- thiol, 14.5 gms., 31%.

According to the procedure of Example III, using suitable starting materials, there is preparable 3,5-diethyl- 1-pyrazoleethanethiol, 3-methyl - 5 - ethyl - 1 - pyrazole- ethanethiol, 3,5- - dipropyl - 1 - pyrazoleethanethiol, 3- butyl - 5 - methyl - 1 - pyrazoleethanethiol and like compounds,

Example IV

The residue left from the final distillation in Example III is dissolved in methanol, treated with activated charcoal, and evaporated to dryness. The residue is dissolved in ether and HCl gas passed in. The gummy product is crystallized twice from ethanol-ether. M.P. 176–178° C.

If the ethereal solution of the free base is diluted with warm hexane and then chilled, the free base is obtained crystalline. Recrystallization from pure hexane gave pure bis[2-(3,5-dimethyl-1-pyrazolyl)ethyl]disulfide. M.P. 78– 79° C.

In a manner similar to that described above in Example IV, one prepares the disulfides of the compounds identified in Example III. These compounds include bis[2-(3,5- diethyl - 1 - pyrazolyl)ethyl]disulfide, bis[2-(3-methyl-5- ethyl-1-pyrazolyl)ethyl]disulfide, bis - [2 - (3,5-dipropyl- 1 - pyrazolyl)ethyl]disulfiide, bis[2 - (3 - butyl-5-methyl- pyrazolyl)ethyl]disulfide as well as other disulfide derivatives.

Example V 1-mercaptoethylpyrazole is prepared in the same method as described in Example III. Yield 33%. B.P. 105–110° C./12 mm.

While the foregoing examples describe the compounds of the present invention with some degree of particularity, it is to be understood that such description provides a clear understanding of the compounds and the method by which they are prepared. The description and the specific examples therefore should not be construed in any way as a limitation on the scope of the invention. The latter is to be limited only by the appended claims.

The invention claimed is:

1. A compound selected from the group consisting of (1) a compound having the formula:

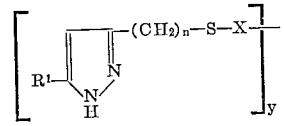

(2) a compound having the formula:

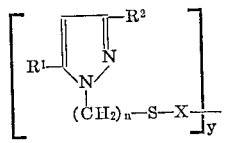

wherein $R^1$ and $R^2$ are selected from the group consisting of hydrogen and lower alkyl; X is hydrogen, $n$ is an integer of from 1 to 3 inclusive and $y$ is an integer of from 1 to 2 inclusive with the proviso that X is present only when $y$ is 1 and (3) a nontoxic, pharmaceutically acceptable acid addition salt thereof.

2. 3-mercaptomethyl-5-methyl pyrazole.
3. Bis(5-methyl-3-pyrazolylmethyl)disulfide.
4. 3,5-dimethyl-1-pyrazole-ethanethiol.
5. Bis[2-(3,5-dimethyl-1-pyrazolyl)ethyl]disulfide.
6. 1-mercaptoethyl pyrazole.

References Cited

Houben-Weyl Methoden der Organischen Chemie, volume 9, Schwefel-, Selen-, Tellur- Verbindungen, pp. 28, 59, 103, and 114–5, Stuttgart, George Thieme.

Pain Jour Chem Soc. (London) 1963, pages 1332–3.

Wagner et al., Synthetic Organic Chemistry pp. 226– 8, 787–8 and 797, New York, Wiley, 1953.

WALTER A. MODANCE, *Primary Examiner.*

N. TROUSOF, *Assistant Examiner.*